Patented Feb. 28, 1928.

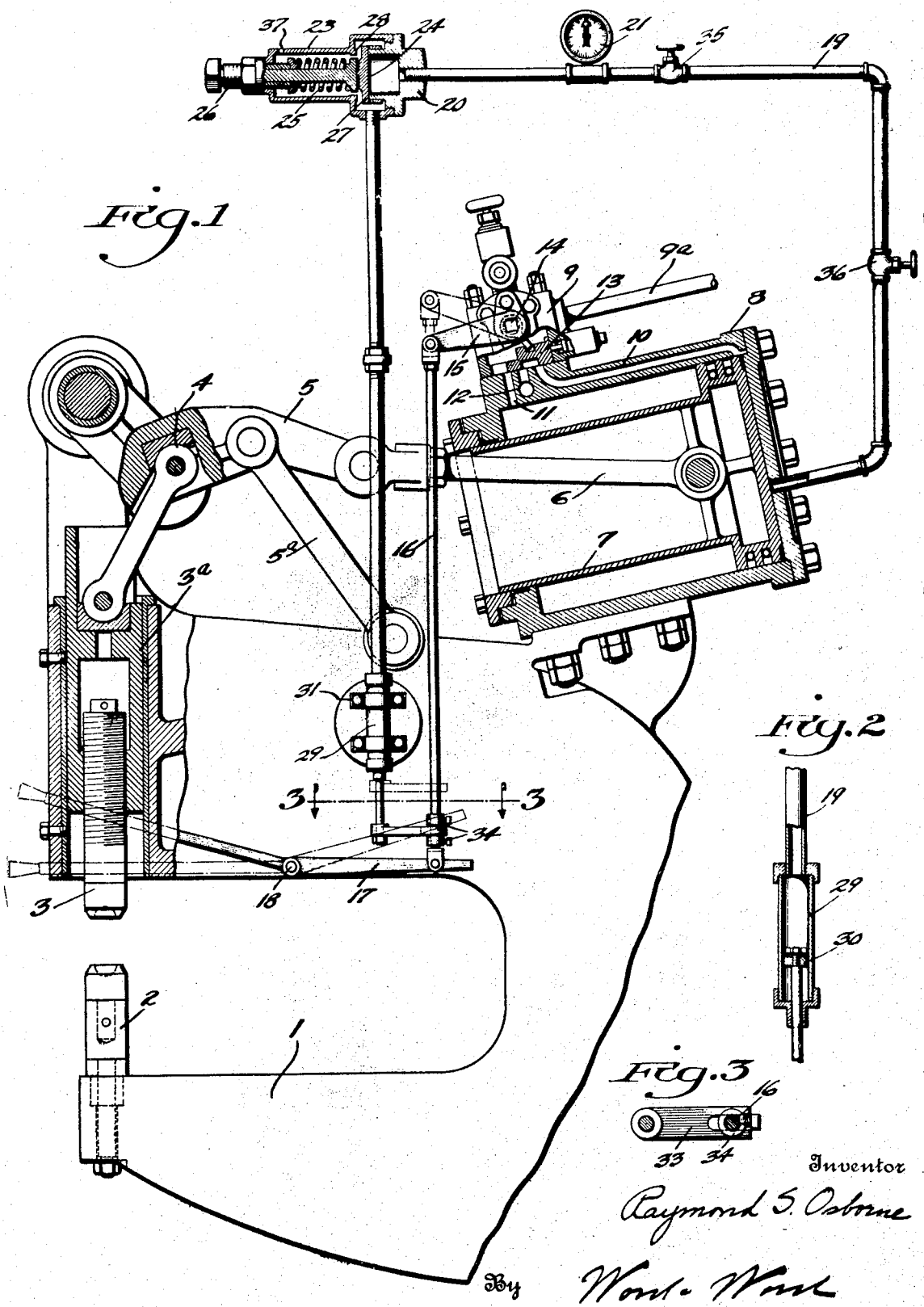

1,660,720

UNITED STATES PATENT OFFICE.

RAYMOND S. OSBORNE, OF WYOMING, OHIO.

RIVETER.

Application filed February 13, 1926. Serial No. 88,159.

My invention relates to improvements in compression riveters which act by direct pressure, and is particularly directed to a device for automatically controlling the pressure developed within the riveter and against the work.

Ordinarily the riveter operates under the entire line pressure, the full pressure being exerted on the rivet regardless of the size of rivet or the type of work which is being done. By this method there is a considerable waste of power and time and frequently the work is damaged by excess pressure. Especially is this so in field work where a uniform pressure must be maintained in the line for operating other pneumatic devices and often this pressure being excessive for the type of work being riveted.

It is highly desirable that it be possible to use the same riveter for a large range in size of rivets and for any weight of work, this necessitating a means for relieving the pressure to the cylinder at a predetermined degree or at the time when the rivet has been sufficiently driven.

Therefore, an object of the invention is to provide a simple mechanism for automatic control of the riveter for relieving the pressure on the rivet and returning the driving mechanism to a starting position when the rivet has received sufficient pressure.

Another object is to provide mechanism for quicker operation of the riveter and for eliminating the waste of power.

Another object is to provide an adjustable mechanism for automatic pressure control of the riveter without change of line pressure.

Further objects and certain advantages will appear in the description of the drawings forming a part of this specification, in which:

Figure 1 is a general view showing the invention mounted in operative position upon a pneumatic riveter of compression toggle-joint type, certain parts of the control mechanism and riveter being broken away to show the inner construction.

Figure 2 is a detailed sectional view of the kick-off cylinder and piston for operating the controlling valve of the air motor.

Figure 3 is a detailed sectional view taken on line 3—3, Figure 1, showing the forked lever on the kick-off cylinder piston rod for operating the control rod.

The improvement is shown as applied to a commercial pneumatic compression riveter of the toggle type which heretofore has been entirely under manual or non-automatic control limiting its capacity as to size of rivet or thickness of plates upon which the machine can be efficiently operated, the piston of the motor operating the riveter taking a full power or forward stroke for each rivet drive. A full pressure under a determined air line pressure is thus always applied upon the rivet and plates which would be excessive in driving rivets smaller in size to the damage of the metal of either rivet or plates.

Referring to the drawing, 1 indicates the yoke frame of a riveter, to provide a throat into which the plates to be riveted are inserted between lower and upper dies. The lower die 2 is stationary and the upper die 3 is mounted upon a plunger 3ª. The plunger 3ª is reciprocated by a toggle 4 actuated by a main lever 5 and guide link 5ª. The main lever 5 pivotally connects with a piston rod 6 connecting with a piston 7 in the motor cylinder 8. The driving cylinder 8 has a control valve casing or chest 9 mounted thereon, into which the air under pressure is delivered from the supply line 9ª. Leading from the valve casing 9 are two passages 10, 11, entering into the driving cylinder and alternating as supply and exhaust passages for forward and retreat strokes of the driving piston. Another passage 12 leads from the valve casing to the atmosphere and serves as an exhaust passage for the passages 10, 11.

A slide valve 13 is mounted within the casing and is grooved for alternately connecting the passages 10, 11 to the exhaust passage 12 and the air supply line 9ª. A shaft 14 extends through the valve casing for operating the valve 11 and a lever 15 is attached to the squared end of the shaft. A rod 16 connects this lever 15 to the control lever 17 pivoted to the frame of the riveter as at 18, this control lever being manually operable for controlling the air supply into the driving cylinder. The lever 17 is moved manually to shift the control valve for admitting the air into the rear end of the cylinder against the piston for a forward or power stroke, and under the prevailing practice the lever is again manually operated for reversing the valve to admit the air pressure against the forward side of the piston for a return stroke. Under such manual method of control a full pressure against the rivet is developed for the full line pressure multiplied by the ratio of the toggle joint, and a full cylinder of air at the line pressure is used at each operation, or at least as much of the cylinder capacity as is developed by the travel of the piston, and it would require delicate manipulation of the hand lever to obtain a regulated control to meet the requirements of variety of sizes of rivets or plate thickness. The pressure in the piston recylinder must be released and the piston returned to its rear positions, whenever the proper pressure has been applied by the driving cylinder necessary to drive the particular size and kind of rivet.

With the present improvement the control for a reverse stroke of the piston is automatic and at a period when a determined pressure in the cylinder is reached or necessary to drive a particular size and kind of rivet, without regard to the line pressure on which the machine is operated. The apparatus can be so regulated, that when driving rivets smaller in size than the full capacity of the machine, only sufficient pressure is exerted to properly drive the rivet, at such point the pressure in the driving cylinder being released and the piston returned to its rear position. Only sufficient air is used to do the work, and no damage will be done to the rivets or plates in which the rivets are driven. This allows the use of the riveter for a large range of size of rivets and without varying the line pressure, and to obtain a very uniform work for each of the different size of rivets.

For the automatic control, an unloading or relief valve 20 connects with the rear end of the cylinder by a pipe 19. The pipe 19 includes a hand operated pressure controlling or reducing valve 35 and pressure gauge 21, the pressure gauge 21 providing a reading for setting the relief valve. The relief valve 20 controls the admission of air or pressure from the main power cylinder to a cylinder of a valve operating motor 22 mounted upon the riveter frame for operating a piston in connection with the valve actuating rod 16 manually actuated by the lever 17.

The unloading or relief valve comprises a casing 23 housing a valve 24 acting against a spring 25, the tension of the spring being adjustable by means of a screw 26 in the casing for varying the pressure at which the valve opens. Normally the valve 24 is held closed against its seat 27 preventing the flow of air from the driving cylinder to the cylinder 29. When the valve is unseated, at a predetermined pressure it engages an opposing seat 28 and opens a passage for the air from the pipe or conduit 19 to the cylinder 29 moving the piston therein downward.

The valve operating motor comprises a cylinder 29 and a piston 30 having a cupped washer thereon. The cylinder is fastened to the riveter frame by means of brackets 31. The piston rod extends through the cylinder head and is provided with a forked lever 33, the forked end of the lever being held between two adjustable collars 34 on the control rod 14.

A choke valve 35 and a valve 36 are placed in the air line 17 between the pressure gauge and the driving cylinder. When the unloading valve is set to operate at a low pressure for light work it has been found that as the air is released into the cylinder for the driving operation a sudden rush of high pressure air through the air line 17 will operate the unloading valve prematurely and this is prevented by including a choke valve in the conduit or pipe 19 to slow down the flow of air.

The relief valve is preliminarily set by adjusting the tension of the spring, to apply a determined pressure upon the valve 24 necessary for holding the valve closed until a determined pressure is reached in the main power cylinder 8, a degree of pressure the rivet should receive to be properly driven. The control lever 17 is then pulled downwardly, this action moving the control rod 16 upwardly for shifting the valve 13 on the driving cylinder. The same operation throws the piston of the motor 22 upwardly and into position for automatic operation.

The valve 13 permits the air to flow from the supply line 9ª into the rear end of the driving cylinder and exhausts the air in the opposite end of the driving cylinder through the groove in the valve which established communication between the port or passage 11 and the exhaust port 12. As the piston 7 is moved forward in its driving stroke, the air flows through the line 19 and as the desired pressure is developed in the driving cylinder and exerted on the rivet, the unloading valve is operated by admitting the pressure to the cylinder 29 moving the piston 30 for tripping the valve 13 and effecting a return stroke of the piston 7.

The air in the cylinder 29 escapes through an aperture 37 in the unloading valve casing after the unloading valve spring 25 returns the valve to its normal seat.

The lever 33 has the forked end engaging the control rod to allow for the slight swing of the control rod inasmuch as it is pivoted at both ends and is disaligned by translation.

It can readily be seen that the mounting of the control device upon the riveter can be varied as long as the various elements are arranged in their proper order.

Having described my invention, I claim:

In combination with a riveting mechanism, a driving cylinder, a driving piston therein for operating the riveting mechanism, a control valve for said driving cylinder, a control lever for said valve, a control feed line leading from said air cylinder, a pressure unloading valve and a control cylinder in said feed line, and a piston in said control cylinder connected to said control lever for operating said control lever when the pressure in the driving cylinder unloads through the unloading valve into the control cylinder.

In witness whereof, I hereunto subscribe my name.

RAYMOND S. OSBORNE.